US011295623B2

(12) United States Patent
Wouhaybi et al.

(10) Patent No.: US 11,295,623 B2
(45) Date of Patent: *Apr. 5, 2022

(54) COMMUNITY DRONE MONITORING AND INFORMATION EXCHANGE

(71) Applicant: Intel Corporation, Santa Clara, CA (US)

(72) Inventors: Rita H. Wouhaybi, Portland, OR (US); Hong Li, Folsom, CA (US); Tobias Kohlenberg, Portland, OR (US); Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/728,227

(22) Filed: Dec. 27, 2019

(65) Prior Publication Data
US 2020/0251001 A1 Aug. 6, 2020

Related U.S. Application Data

(63) Continuation of application No. 16/270,919, filed on Feb. 8, 2019, now Pat. No. 10,522,048, which is a (Continued)

(51) Int. Cl.
*G08G 5/00* (2006.01)
*B64C 39/02* (2006.01)
*G06K 9/00* (2022.01)

(52) U.S. Cl.
CPC ......... *G08G 5/0082* (2013.01); *B64C 39/024* (2013.01); *G06K 9/0063* (2013.01);
(Continued)

(58) Field of Classification Search
CPC .. G08G 5/0082; G08G 5/0026; G08G 5/0034; G08G 5/006; G08G 5/0069;
(Continued)

(56) References Cited

U.S. PATENT DOCUMENTS 8,954,853 B2 2/2015 Lacaze et al.
9,310,477 B1 4/2016 Sampigethaya
(Continued)

OTHER PUBLICATIONS

"U.S. Appl. No. 14/581,881, Non Final Office Action dated Aug. 3, 2016", 5 pgs.
(Continued)

*Primary Examiner* — Richard M Camby
(74) *Attorney, Agent, or Firm* — Schwegman Lundberg & Woessner, P.A.

(57) ABSTRACT

A method may include receiving, using at least one processor, location information that includes a location of an unmanned aerial vehicle (UAV); querying, using the at least one processor, a policy database to retrieve a notification condition for a first property with respect to UAVs; calculating, using the at least one processor, a distance between the UAV and the first property using the received location information determining, using the at least one processor, if the distance of the UAV with respect to the first property is within a range defined in the notification condition for the first property; and transmitting, using the at least one processor, a notification to a party associated with the first property when the distance of the UAV with respect to the first property is within the range defined in the notification condition for the first property.

30 Claims, 6 Drawing Sheets

Related U.S. Application Data continuation of application No. 15/713,850, filed on Sep. 25, 2017, now abandoned, which is a continuation of application No. 14/581,881, filed on Dec. 23, 2014, now Pat. No. 9,773,422.

(52) U.S. Cl.
CPC ....... *G06K 9/00624* (2013.01); *G08G 5/0004* (2013.01); *G08G 5/006* (2013.01); *G08G 5/0026* (2013.01); *G08G 5/0034* (2013.01); *G08G 5/0069* (2013.01); *B64C 2201/00* (2013.01); *B64C 2201/145* (2013.01); *B64C 2201/146* (2013.01)

(58) Field of Classification Search
CPC .............. G08G 5/0004; G06K 9/0063; G06K 9/00624; B64C 39/024; B64C 2201/145; B64C 2201/146; B64C 2201/00
See application file for complete search history.

(56) References Cited

U.S. PATENT DOCUMENTS

| | | | | |
|---|---|---|---|---|
| 9,665,094 | B1 * | 5/2017 | Russell | B64D 47/08 |
| 9,671,781 | B1 * | 6/2017 | Peeters | G05D 1/0027 |
| 9,773,422 | B2 | 9/2017 | Wouhaybi et al. | |
| 10,522,048 | B2 | 12/2019 | Wouhaybi et al. | |
| 2014/0316616 | A1 | 10/2014 | Kugelmass | |
| 2015/0254988 | A1 | 9/2015 | Wang et al. | |
| 2016/0180719 | A1 | 6/2016 | Wouhaybi et al. | |
| 2018/0247546 | A1 | 8/2018 | Wouhaybi et al. | |
| 2019/0172360 | A1 | 6/2019 | Wouhaybi et al. | |

OTHER PUBLICATIONS

"U.S. Appl. No. 14/581,881, Notice of Allowance dated Mar. 1, 2017", 6 pgs.
"U.S. Appl. No. 14/581,881, PTO Response to Rule 312 Communication dated Aug. 24, 2017", 2 pgs.
"U.S. Appl. No. 14/581,881, Response filed Jan. 27, 2017 to Non Final Office Action dated Aug. 3, 2016", 10 pgs.
"U.S. Appl. No. 15/713,850, Non Final Office Action dated Jun. 7, 2018", 6 pgs.
"U.S. Appl. No. 15/713,850, Notice of Non-Compliant Amendment dated Dec. 14, 2018", 3 pgs.
"U.S. Appl. No. 15/713,850, Response filed Dec. 7, 2018 to Non Final Office Action dated Jun. 7, 2018", 7 pgs.
"U.S. Appl. No. 16/270,919, Corrected Notice of Allowability dated Oct. 25, 2019", 2 pgs.
"U.S. Appl. No. 16/270,919, Corrected Notice of Allowability dated Nov. 4, 2019", 2 pgs.
"U.S. Appl. No. 16/270,919, Notice of Allowance dated Aug. 28, 2019", 8 pgs.
U.S. Appl. No. 14/581,881 U.S. Pat. No. 9,773,422, filed Dec. 23, 2014, Community Drone Monitoring and Information Exchange.
U.S. Appl. No. 15/713,850, filed Sep. 25, 2017, Community Drone Monitoring and Information Exchange.
U.S. Appl. No. 16/270,919 U.S. Pat. No. 10,522,048, filed Feb. 8, 2019, Community Drone Monitoring and Information Exchange.

* cited by examiner

COMMUNITY DRONE MONITORING AND INFORMATION EXCHANGE

PRIORITY

This application is a continuation of U.S. patent application Ser. No. 16/270,919, filed Feb. 8, 2019, which is a continuation of U.S. patent application Ser. No. 15/713,850, filed Sep. 25, 2017, which is a continuation of U.S. patent application Ser. No. 14/581,881, filed Dec. 23, 2014, all of which are incorporated by reference herein in their entirety.

TECHNICAL FIELD

Embodiments described herein generally relate to drones and in particular, but not by way of limitation to community drone monitoring and information exchange.

BACKGROUND

Drones, such as unmanned aerial vehicles (UAVs), are no longer restricted to being operated by military or government personnel. Increasingly, the drones are being operated by commercial companies as well as individuals. In many jurisdictions, laws are unclear or non-existent as to where, or if, drones may operate. Thus, drone operators have little information about what may or may not be permitted in a given area. Additionally, concerned property owners have no way to knowing who is operating a drone that is flying over their property.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Sometimes, drone operators (e.g., commercial, military, amateur, etc.) and property owners (title holder, renters, etc.) have divergent opinions about the value of drones. Thus, in some extreme instances, property owners have taken action on their own and shot down drones flying near or over their property—however, not all property owners feel this way.

Accordingly, in various examples described herein, systems are described that facilitate information exchange between drone operators and property owners, among drone operators, and among property owners. For example, drone operators may provide information about the purpose of a flight, the route of the flight, sensors used on the drone, capabilities of the drones, and identifying information of the operator. Property owners may provide a policy of when it is acceptable for drones to operate near their property, which drones may operate, what type of sensing is allowed, as well as a cost to fly over their property. The system may also provide benefits such as route management for drone operators, alerting property owners when drones are detected near their property, violations of conditions set by owners, groupings of property owners to share information and have group drone policies, and alerting law enforcement agencies of illegal or unwanted drone and owners activities. Additional benefits may be apparent to a person of ordinary skill in the art upon reading the present disclosure.

Figure 1:
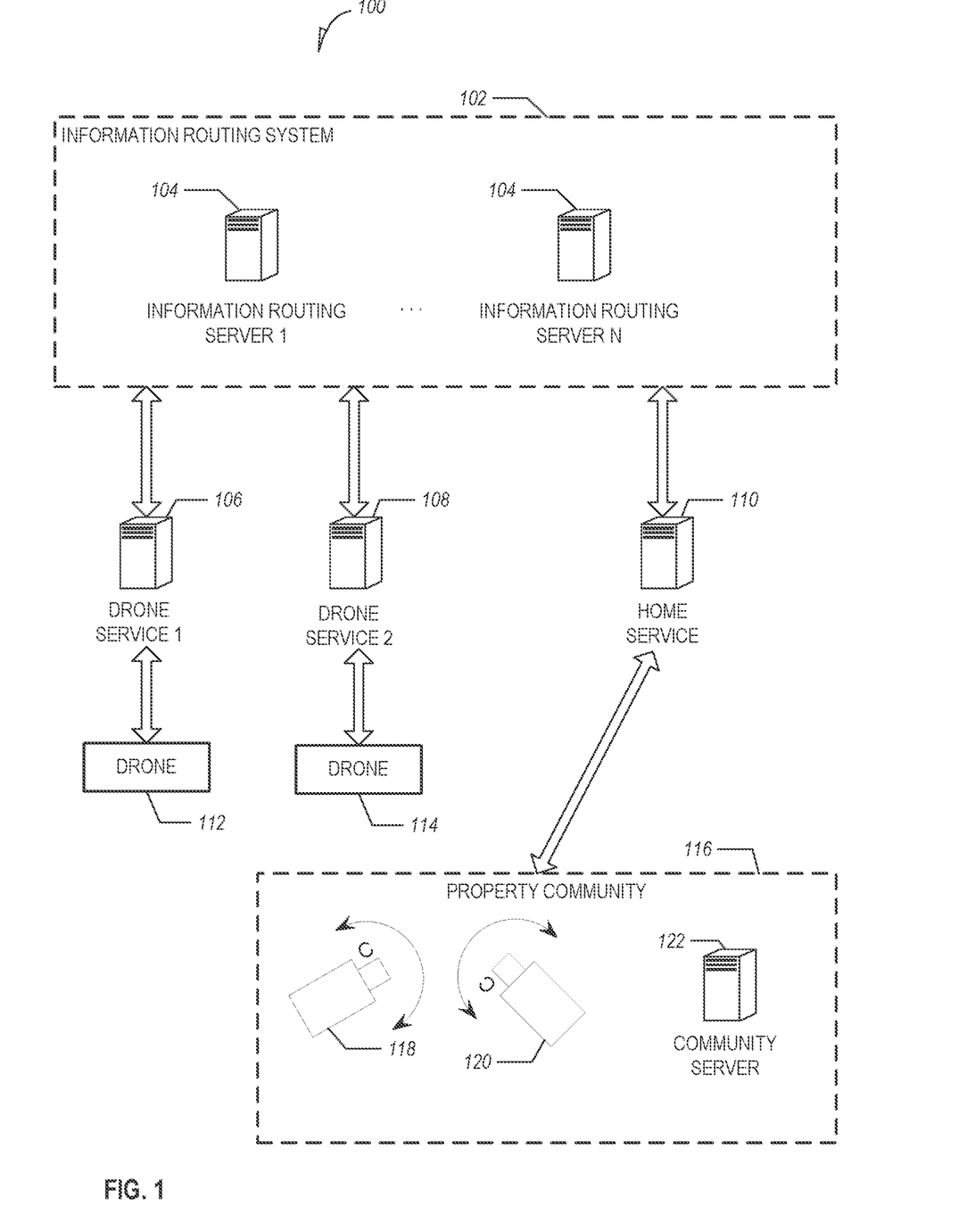
FIG. 1 is a component diagram illustrating an overview of a drone information sharing system, according various examples.

FIG. 1 is a component diagram 100 illustrating an overview of a drone information sharing system, according to various examples. Diagram 100 includes information routing system 102, information routing servers 104, drone services 106 and 108, home service 110, drones 112 and 114, property community 116, cameras 118 and 120, and community server 122. While the components are illustrated as existing in separate locations, the components may be deployed in other arrangements. For example, drone service 108 and home service 110 may be a single server. In various examples, some components may be omitted during some or all communication. For example, a drone service may communicate directly with a home service without going through the information routing servers. Similarly, the labels of the components are for illustration purposes and other labels may be used without departing from the scope of this disclosure.

In various examples, the servers and components of the diagram 100 may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

In various examples, the property community 116 is associated with one or more properties. A property may be defined as a geographic region (e.g., metes and bounds using sets of geo-location coordinates). For example, a property may be a farm, a house, a commercial building, etc. In an example, a property has one or more property owners. A property owner does not need to be the title holder of a piece of property, but rather is the person(s) concerned with drone activity near the property (e.g., has an investment in the property). For example, a property owner may be a renter.

Groups of property owners may be assembled into a property community 116. The properties associated with the property community 116 may be contiguous properties or spread over a large distance. For example, property owners in a neighborhood may group together to form a property community 116. In another example, people with common interests (e.g., celebrities, extended families, religious groups) may form a property community 116 with properties in multiple cities.

In various examples, the property community 116 includes sensors, such as cameras 118 and 120, deployed throughout the community 116. The sensors may be associated (e.g., own, operated, located) with a single property owner or multiple property owners. In various examples, sensors include cameras (e.g., infrared, visual, and depth), noise, temperature, and chemical sensors. In addition to physical sensors such as listed above, online sensors may be utilized. Online sensors may use information retrieved from social networks or other internet-based services to determine the presence of drones and information about drones in the area of the property community 116.

In various examples, the community server 122 receives data from the sensors within the property community 116. The community server 122 may then process the data to determine if a drone is operating within or around one of the properties of the property community 116. For example, the community server 122 may use image processing software that analyzes video from the sensors to detect the presence of a drone (e.g., using object recognition).

Upon detecting a drone, the community server 122 may transmit a command to other sensors in the area to determine additional characteristics of a drone. For example, a depth camera may be utilized to determine elevation of a drone or an optical character recognition may be utilized to determine an identity of the drone (e.g., via analysis of a pictures of the drone when it has identifying markings). Audio could also be used to detect the noise level of the drones. Other sensors could detect environmental data such $CO_2$.

In various examples, the sensors perform the analysis instead of, or in addition to, sending the data to the community server 122. For example, the camera 118 may have motion detection and object recognition software included on the camera. Thus, when a drone is operating in view of the camera 118, a notification may be sent to the community server 122 that a drone is operating in the area, which in turn may trigger additional sensors to collect more data about the drone.

Figure 2:
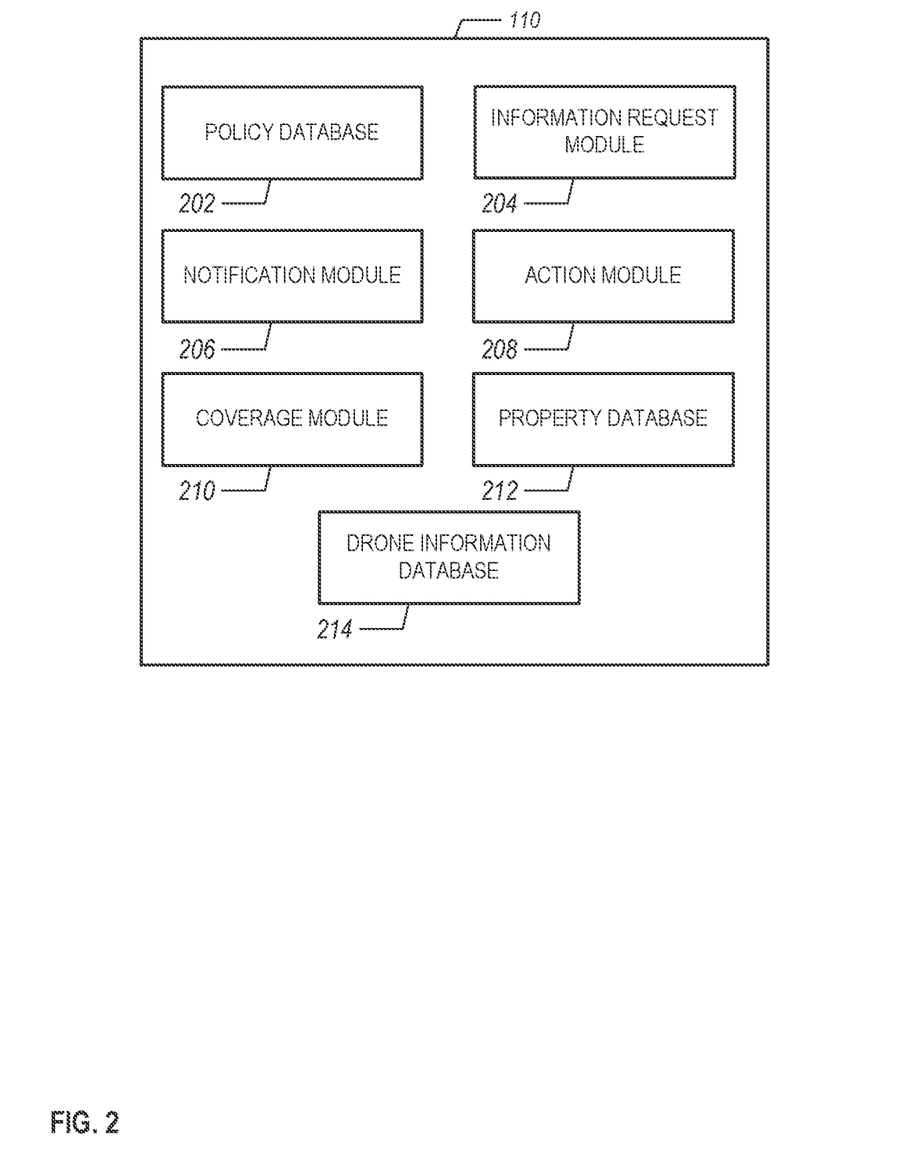
FIG. 2 illustrates components of a home service, according to various examples.

FIG. 2 illustrates components of the home service 110, according to various examples. The home service 110 is illustrated as including a policy database 202, an information request module 204, a notification module 206, an action module 208, a coverage module 210, a property database 212, and a drone information database 214. While the components and databases of FIG. 2 are illustrated as existing separately, two or more of the components or databases may be merged. For example, policy database 202 and property database 212 may exist as a single database. Similarly, the labels of the modules and database are for illustration purposes and other labels may be used without departing from the scope of this disclosure.

In various examples, home service 110 is a service operated via one or more computers for property owners in a community. For example, home service 110 may be a network-based service (e.g., a cloud operated service) operating on one or more server computers. In an example, home service 110 is operated for at least one group of property owners. The home service 110 may provide a variety of services to the property owners with respect to drones as detailed herein. Property owners may interact with the home service 110 using one or more interfaces. For example, a web-based interface may be provided by the home service 110 that a user (e.g., a property owner) may log in to and set one or more preferences or conditions in the policy database or perform other actions.

In an example, the policy database (e.g., relational, flat file, non-relational) 202 stores policies for one or more property owners with respect to one or more properties. A policy may include a variety of conditions on drone operation with respect to a property. The conditions may include, but are not limited to, physical conditions, temporal conditions, cost conditions, and reputation conditions. The policy may also include preferences of a property owner with respect to information sharing and notifications. The use of the terms conditions and preferences is not intended to mean a functional difference, but is used for readability to conceptually separate restrictions on where/when/how a UAV may operate and preferences for receipt or transmission of information from sensors. For example, a notification preference may also be considered a notification condition without departing from the scope of this disclosure.

In an example, physical conditions are conditions related to where a drone may operate with respect to a property. For example, there may be height restrictions (e.g., a minimum height) with respect to a property. Another physical condition may be a radius in which a property owner indicates drones cannot operate. For example, a property owner may set a 100 foot radius that indicates a preference that no drone is to operate within 100 feet of the property. Other restrictions may include noise level generated by the drone, or type of sensors (cameras, microphone, etc.) activated on the drone.

In an example, temporal conditions include conditions on when drones may operate near (e.g., as set by a physical condition) a property. For example, a temporal condition may indicate that a drone may operate near their property between the hours of 9 AM and 5 PM. Other temporal conditions may be based on day (e.g., Monday, Tuesday), month, or season.

In an example, cost conditions include information that identifies a cost to fly near a property. For example, a cost condition may indicate that a drone may operate near a property for the cost of five dollars. A cost condition may be defined in a variety of ways such as, per trip or per a time period (e.g., 5 cents per minute or flat fee per month). A property owner may also define a cost for flying over multiple properties. For example, the property owner may offer a flat fee per month to fly over any properties owned by the property owner.

In various examples, reputation conditions define what reputation level is needed for a drone to fly near his or her property. In an example, a reputation level is based on prior behavior of the drone or prior behavior of an operator of the drone. For example, the reputation level of a drone may increase (e.g., become more reputable) if it has previously abided by the conditions of property owners. Or, the reputation level of a drone may be decrease (e.g., become less reputable) if, when asked to leave a property, the drone remains near the property.

The reputation level may be stored in the drone information database 214 as a qualitative (e.g., good or bad) or quantitative (e.g., 0-10 with 0 being bad reputation) value. The reputation level may be continuously adjusted based on behavior of the drone as reported by sensors or property owners to the home service 110. In example, the reputation of a drone is stored in the drone information database 214.

In various examples, information sharing preferences are preferences of a property owner with respect to the drone information gathered by sensors on a property. A hierarchical approach may be utilized such that different levels of sharing may be utilized for different groups. For example, a property owner may indicate that all data collected by sensors may be shared with other property owners within the property community 116 (e.g., location, elevation, noise data, etc.), but only the location of a drone is shared with property owners outside of the property community 116. Additionally, preferences may set with respect to the actual video or image capture of a drone. For example, a property owner may allow access to video feeds of cameras to law enforcement but not to other property owners. A variety of groups may be specified in the information sharing preferences including but not limited to, specific property owners, property communities, zip-codes, cities, states, world, drone operators, and law enforcement.

In various examples, notification preferences of a property owner indicate when the property owner should be notified about a drone, how the property owner should be notified, and what information should be included in the notification. For example, a notification preference may indicate that when a drone is within 10 miles of a property a property owner should receive a push notification on the property owner's phone with an estimated time-of-arrival with respect to the property. Multiple notifications may be transmitted for a single drone (e.g., a subsequent push notification may be transmitted when the drone arrives at the property and another notification when the drone has exited the property). Additionally, the capabilities of a drone may be taken into account when sending a notification. For example, a property owner may indicate that he or she only wants to be notified when a drone's camera can view the property or was suspected to be operating (this may occur before or after the drone is within a range for a separate notification as discussed above).

In various examples, combinations of conditions and notifications may be defined in a policy for a property owner. For example, a notification of a policy may be set that triggers if a drone that has a reputation less than five is within 10 miles of a property past 5 PM. Or, a cost condition may indicate that there is no cost between the hours of 9 AM-5 PM, but will cost $5 between the hours of 5 PM and 10 PM, and no drones allowed between 10 PM and 9 AM. Other conditions may also be incorporated into the policy without departing from the scope of this disclosure including noise conditions, drone type conditions, and drone operator conditions.

To set, modify, or delete a policy condition or preference, a property owner may log in to the home service 110. For example, a property owner may utilize an application on a computing device (e.g., tablet, personal computer, mobile phone) or a web-browser to access a user interface provided by the home service 110. Using input mechanisms as known in the art (e.g., input boxes, drop-down menus, check boxes, etc.), a property owner may select the conditions and notifications for a property. Upon modifying or adding a condition/notification, home service 110 may update a storage device with the entered information. For example, a database may be used that stores a policy entry for a property owner (e.g., each property and property owners may have IDs with which a notification or condition may apply).

In various examples, the information request module 204 responds to request for information about properties within a property community—such as the property community 116—and information from sensors placed therein (also referred to as sensor networks). For example, a drone operator may issue (e.g., via a computing device) a request to determine the lowest-cost route from point A to point B. The request may initially be received by the information routing system 102, as discussed further below, where it is routed over a network to the home service 110. The information request module 204 may perform a lookup in the policy database 202 to retrieve cost conditions for properties along or near (e.g., within a predetermined radius) the route from point A to point B and transmit the costs, if any, associated with each property. In an example, the information request module 204 takes into consideration the planned timing of the route to perform the cost lookup. For example, if the request indicates the drone is going to be flying in June on a Monday at 10:00 AM, the information request module will access the cost for those conditions as stored in the various policies.

In various examples, the information request module 204 accesses the information sharing preferences for a property or property owner when responding to a request for information. For example, if the request is from a drone operator for weather conditions in the property community 116, the policies of the property owners in the area may be consulted to determine if that information is willing to be shared with drone operator.

In various examples, the notification module 206 notifies one or more parties when a drone meets the conditions set forth in a policy. For example, upon receiving information about a drone (e.g., its location, path, speeds, capabilities, etc.) from sensors within the property community 116 or other source, the notification module 206 may query the policy database 202 to retrieve one or more relevant policies. In an example, relevant policies are those policies that include notification conditions. The notification conditions may be checked to see if a drone's location meets a notification condition with respect to a property, and if the condition is met, a notification may be sent to a party (e.g., owner) associated with the property.

In various examples, the notification module 206 may calculate a path and speed for a drone and notify a party about an estimated time-of-arrival for a drone. For example, the path and speed may be calculated based on receiving at least two detections of the drone; either from a single sensor or multiple sensors. Then, the policy database 202 may be queried to determine properties along the determined path that have time-of-arrival notifications requested and transmit an estimated time-of-arrival based on the calculated speed. The estimated time-of-arrival may be updated as more detections of the drone occur.

In various examples, the action module 208 may be utilized to alert law enforcement of unknown, low reputation drones, or drones that are operating again local ordinances. For example, upon receiving information about a drone (e.g., its location, path, speeds, capabilities, etc.) from sensors within the property community 116 or other source, the action module 208 may query the drone information database 214 to determine if there is an entry for the drone. If there is no entry for the drone, or the reputation for the drone is less than a certain value, a video feed of the drone may be transmitted to local law enforcement—assuming the party responsible for the feed has authorized such video release. Other actions may include property owners and/or the community deciding to take their own actions such as querying the drone information database and blocking the drone's from flying over the neighborhood.

In various examples, the coverage module 210 analyzes the coverage for a property community. For example, the coverage module 210 may use the locations of the sensors to determine the density (e.g., sensor per 100 ft. sq.) of coverage for a property or group or properties. If the density is below a certain threshold over a property, the coverage module 210 may lookup who owns or is otherwise responsible for the property (e.g., via property database 212) and transmit a request to install a sensor. In an example, property owners or other parties are provided credit for installing sensors or for providing information via sensors installed on their properties. The credit may be redeemed for money or for receiving information from other sensors not owned by the credited party.

In an example, the coverage module 210 also identifies areas that a property owner has indicated he or she does not care if there is adequate coverage. These areas may be excluded from any density calculations. Similarly, if a drone is operating within these areas, notifications may not need to be transmitted for the excluded areas.

The property database 212 may include entries on properties within one or more property communities managed by the home service 110. For example, an entry may include an identification (ID) of the property, its location coordinates, and a party responsible (e.g., managing the sensors and setting the policy) for the property. A property may be part of multiple property communities.

In various examples, the drone information database 214 includes entries for drones the home server 110 has information on. For example, a drone entry may include one or more pieces of information such as, but not limited to, type of drone, identification number, current location, last known location, path, speed, elevation, cargo, capabilities, reputation, and owner. When the home service 110 receives information that a drone has been detected, the drone information database 214 may be updated with the new information with respect to the drone or a new entry may be created if the drone has not been detected before. In various examples, drone operators may proactively register information about their drones. The home service may receive this information directly or via the information routing system 102.

In an example, when the home service 110 receives information that a drone has been detected, the home service 110 may transmit requests to other sensors in the area of the drone to collect additional information about the drone (e.g., elevation, speed, noise level)—subject to information sharing policies—and update the drone information database 214 with the information.

In various examples, the home service 110 also implements a reputation system for providers of information. The providers may include sensors, home owners, or drone operators. The quality or accuracy of information provided to the home service 110 may be corroborating by other sensor or people. If the information is corroborated, the reputation of the provider may be increased. Conversely, if the information is determined to be false or inaccurate, the reputation may be decreased.

The reputation of the provider may be taken into consideration before notifications are transmitted or the drone information database is updated. For example, if the home service 110 receives information from a drone operator that the drone will be over a property in 10 minutes and the operator has a high reputation (e.g., using a qualitative or quantitative scale), the drone information database may be updated and the property owner notified—even before a sensor detects the drone. If, on the other hand, the drone operator has a low reputation, visual or audio confirmation of the drone may be used before transmitting a notification to the property owner. Also the reputation or property owners and communities may be taken into consideration when computing the cost of a flight by the drone operator, which will factor in potential damage to the drone or the reputation of the operator due to false reporting.

Figure 3:
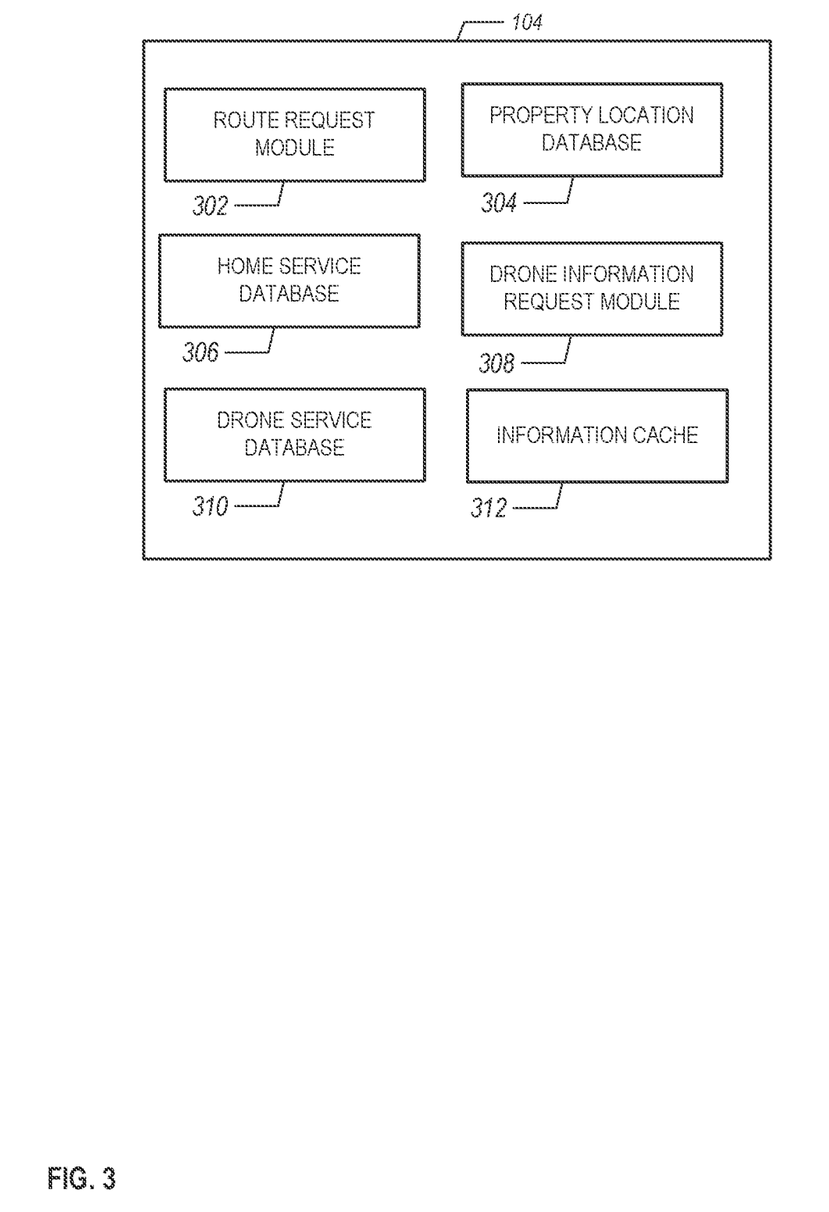
FIG. 3 illustrates components of an information routing server, according to various examples.

FIG. 3 illustrates components of an information routing server 104, according to various examples. The components illustrated may operate on one or more information router servers 104 as part of the information routing system 102. In an example, the components include a route request module 302, a property location database 304, a home service database 306, a drone information request module 308, a drone service database 310, and an information cache 312. The components may be duplicated across multiple information routing servers such that multiple requests may be handled simultaneously. While the components and databases of FIG. 3 are illustrated as existing separately, one or more of the components or databases may be merged. For example, the property location database 304 and the home service database 306 may exist as a single database. Similarly, the labels of the modules and database are for illustration purposes and other labels may be used without departing from the scope of this disclosure.

In an example, the route request module 302 processes requests for route information that have been received from one or more drone operators via drone service (e.g., drone service 106 or drone service 108). A route request may include a request to determine the cheapest route or conditions along a route. In an example, a route request includes information on where a drone is planning on flying, under what conditions, and when the flight is planned. The request module 302 may query the property location database 304 to determine costs, condition information, probabilistic confidence of the data, and expected reputation of the drone and drone operator after the flight is done, along the proposed set of routes.

In various examples, property location database 304 includes information on which home service has information on policies for drone flights over a property. For example, the property location database 304 may have an entry that says the home service 110 has information on all properties with the 90210 zip code. Thus, consider that the planned route includes a flight going through the 90210 zip code. In such a scenario, the information routing system 102 may query the home service database 306 to retrieve an address (e.g., IP address) of the home server 110 and transmit a request to the address to retrieve cost or route conditions over properties in that zip code along the proposed route.

Thus, for any given request, multiple lookups to both the property location database 304 and home service database 306 may be made. Similarly, multiple requests to one or more home services may be transmitted for a single request. The information received from the home services may be transmitted back to the requesting drone service. In an example, the results are stored in information cache 312 for a period of time (e.g., 15 minutes) to allow for quick retrieval if a subsequent request is made that needs the same information (e.g., another request for cost information for flying over area code 90210).

In various examples, home services may advertise the services available to drone operators. The availability of the advertised services may be stored in the home service database 306. The services may include for example, the availability of cost information or weather conditions along a route.

In an example, home services may request information from drone services via the information routing system 102. For example, when a drone is detected over a property, a home service may request an identity, purpose, speed, path, etc. In an example, the drone information request module 308 may be receive the request and query the drone service database to retrieve the information.

In an example, the drone service database stores entries that indicate which drones services and drone operators are associated with which drone. For example, each drone may have a unique identifier. The identifier may be printed on the drone such that when a sensor detects the drone, the identifier may be read using image analysis techniques such as OCR (Optical Character Recognition). Accordingly, when a request is received at the drone information request module, the request may include the identifier, which in turn may be used to query the drone service database. Upon determining the appropriate drone service, a request may be transmitted for the drone information to the determined drone service. A response may be received from the drone service with the requested information, which may then be transmitted back to the requesting home service. A drone with a unique identifier may automatically start with a better reputation than an anonymous one or one that carries an operator logo or credentials.

In various examples, in addition to providing weather conditions or cost conditions along a proposed route, drone service may include tracking of lost drones. For example, if a drone operator loses track of a UAV, a request may be transmitted for the information routing system 102 to attempt to find out what happened to the drone. This process may entail using the last known location of the drone as a query into the property location database 304. The result of the query may indicate the home service associated with the last location. A request may then be transmitted to the home service from the information routing service 102 for video of the drone to determine if the drone crashed or was shot down.

Figure 4:
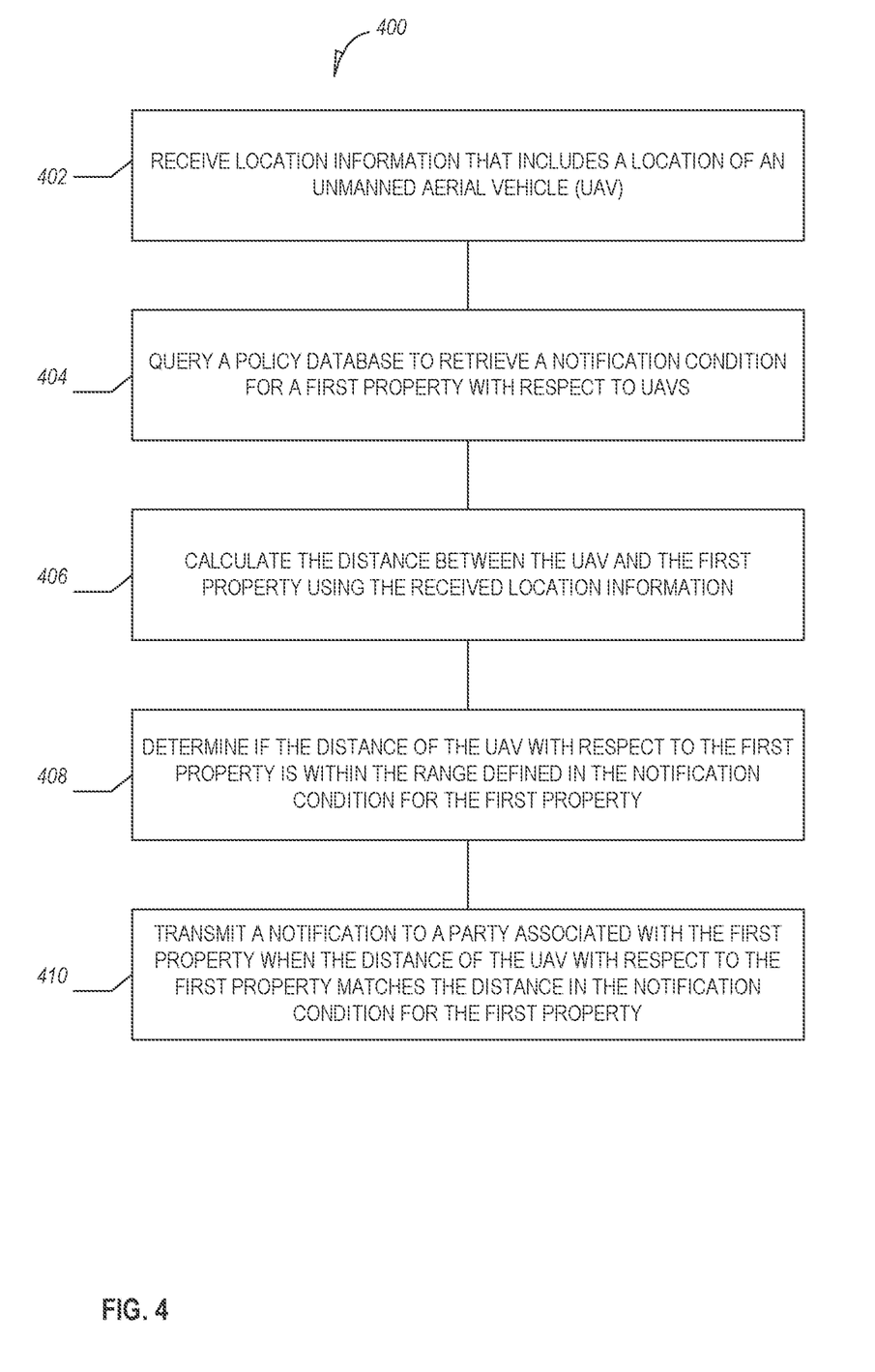
FIG. 4 is a flow chart illustrating a method to notify a party of a UAV, according to various examples.

FIG. 4 is a flow chart illustrating a method 400 to notify a party of a UAV, in accordance with an example embodiment. The method 400 may be performed by any of the modules, logic, or components described herein.

In an example, at operation 402, location information is received that includes a location of an unmanned aerial vehicle (UAV). The location information may be received at a server that provides services to home owners associated with UAVs/drone (e.g., connected home service 110). The information may originate from one or more sensors and be transmitted directly to the server or via additional servers (e.g., community server 122).

In an example, at operation 404, a policy database is queried to retrieve a notification condition for a first property with respect to UAVs. The policy database may be stored on the same server that received the location information or it may be a separate server. The policy database may indexed according in a variety of manners, including but not limited to, property identification and property owner. Thus, the policy database may be queried using an identification of the property. In various examples, the policy database may be queried for notification conditions for multiple properties. The notification may include preferences of when a party should be notified of a UAV as discussed previously.

In various examples, the location information may be obtained from a sensor that is not located on the first property (e.g., a second property). The location information may be subject to sharing restrictions. Accordingly, the policy database may be queried to retrieve their information sharing preferences and determine if the preferences allow for sharing of the location information from the sensor. In an example, the reputation for the sensor associated with the second property may be increased in response to validating the location information with a third sensor (e.g., a sensor that corroborates the location information).

In an example, at operation 406, the distance between the UAV and the first property is calculated using the received location information. For example, the location information may include latitude/longitude coordinates. Similarly, a property database may include boundary information for the first property, which may include one or more sets of latitude/longitude coordinates. The distance may be calculated to the center of the first property or to a boundary of the first property.

In an example, at operation 408, it is determined if the distance of the UAV with respect to the first property is within a range defined in the notification condition for the first property. For example, the notification condition may be "notify when within 10 miles." Then, if a drone is within 10 miles of a property the condition may be triggered. Then, at operation 410, a notification is transmitted to a party associated with the first property when the distance of the UAV with respect to the first property is within the range defined in the notification condition for the first property. Notifications may include, but are not limited to, e-mail, push notifications, SMS, mobile application messages, and voice messages.

In various examples, additional operations may also be performed when the location information is received. For example, the transmission of a request for speed and path information for the UAV may be triggered in response to receiving the location information. The request may be transmitted from a home service to the sensor directly, an intermediary server that is in communication with/manages the sensor, a drone service, or an information routing system in communication with the information routing service. The speed and path information may be transmitted back to a home service in response to the request. In an example, an estimated time-of-arrival to the first property with respect to the UAV may be calculated based on the speed and path information. Further, a notification may be transmitted to the party associated with the first property including the estimated time-of-arrival to the first property.

In various examples, an operation may include querying a drone information database using an identification of the UAV to determine camera capabilities of the UAV. For example, the identification may be determined by analyzing characters on the UAV or from the UAV broadcasting its identification via a transponder or other transmitter. The identification number may be transmitted to an information routing system to receive information about the UAV including whether or not it has a camera and the range of the camera. Then, in an example, a calculation may be made to determine when the UAV will be able to see a first property and transmit a notification to the party associated with the first property with the calculated timed.

In various examples, the operations may include receiving a request, from a requesting party, for elevation information of the UAV. The requesting party may be a drone operator, a law enforcement agency, or a party associated with a second party. It may be determined that a first sensor on the first property has the elevation information for the UAV. Then, the policy database may be queried to retrieve an information sharing preference for the party associated with the first property. The elevation information may be transmitted to the requesting party when the information sharing preference indicates the requesting party is an authorized party (e.g., is authorized to receive the information).

In an example, operations may also include analyzing a coverage area for a plurality of sensors with respect to a plurality of properties and determining that the density of sensors to property is lower than a threshold. Then, a notification may be transmitted to one or more parties associated with the plurality of properties that sensor coverage for the plurality of properties is below the threshold.

In an example, another notification that may be sent is to an operator of the UAV. For example, a notification may be transmitted that the first property has a temporal condition and that the UAV is to leave the property. If the UAV does not leave within a set period of time, an indication may be stored of a lower reputation for the UAV. For example, a drone information database may store reputation levels of UAVs.

Figure 5:
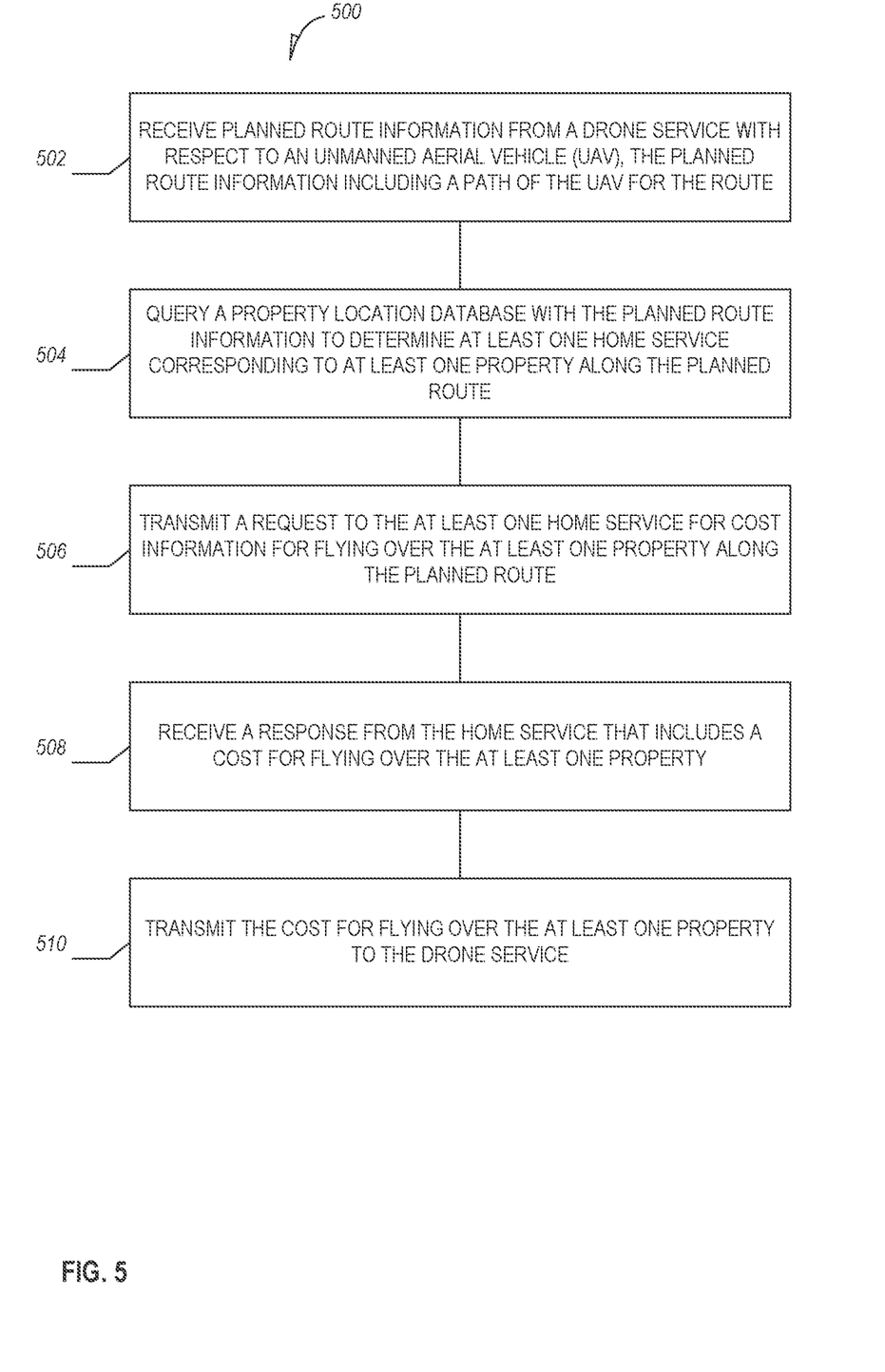
FIG. 5 is a flow chart illustrating a method to retrieve route information, according to various examples.

FIG. 5 is a flow chart illustrating a method 500 to retrieve route information, in accordance with an example embodiment. The method 500 may be performed by any of the modules, logic, or components described herein.

In an example, at operation 502, planned route information from a drone service is received with respect to an unmanned aerial vehicle (UAV). The planned route information may include a path of the UAV for the route. For example, the path may be based on a set of coordinates (e.g., longitude/latitude). The route information may originate from a drone operator who has entered the information using a user interface provided by the drone service (e.g., a website or other application). The route information may also include a time when the planned route is to occur.

In an example, at operation 504, a property location database may be queried with the planned route information to determine at least one home service corresponding to at least one property along the planned route. For example, the home service database may include entries of what home service servers are in communication with which properties based on the locations of the properties.

In an example, at operation 506, a request is transmitted to the at least one home service for cost information for flying over the at least one property along the planned route. In an example, the time of the planned route is transmitted to the home service.

In an example, at operation 508, a response from the home service is received that includes a cost for flying over the at least one property and at operation 510, the cost for flying over the at least one property is transmitted to the drone service. In an example, the response from the home service includes an indication that the cost to fly over the at least one property at the time is higher than the cost to fly over the at least one property at a different time and transmitting the cost to fly over the at least one property to the different time to the drone service.

In an example, a further operation may include receiving a request for condition information along the planned route and transmitting a request for condition information to the home service. The home service may respond with the current conditions for the at least one property in response to the request for condition information. Conditions may include weather conditions such as visibility, temperature, humidity, etc. The conditions may also include whether the property owner has been hostile (e.g., attempted to shoot down or otherwise obstruct the flight) of UAVs in the past.

Example Computer System

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
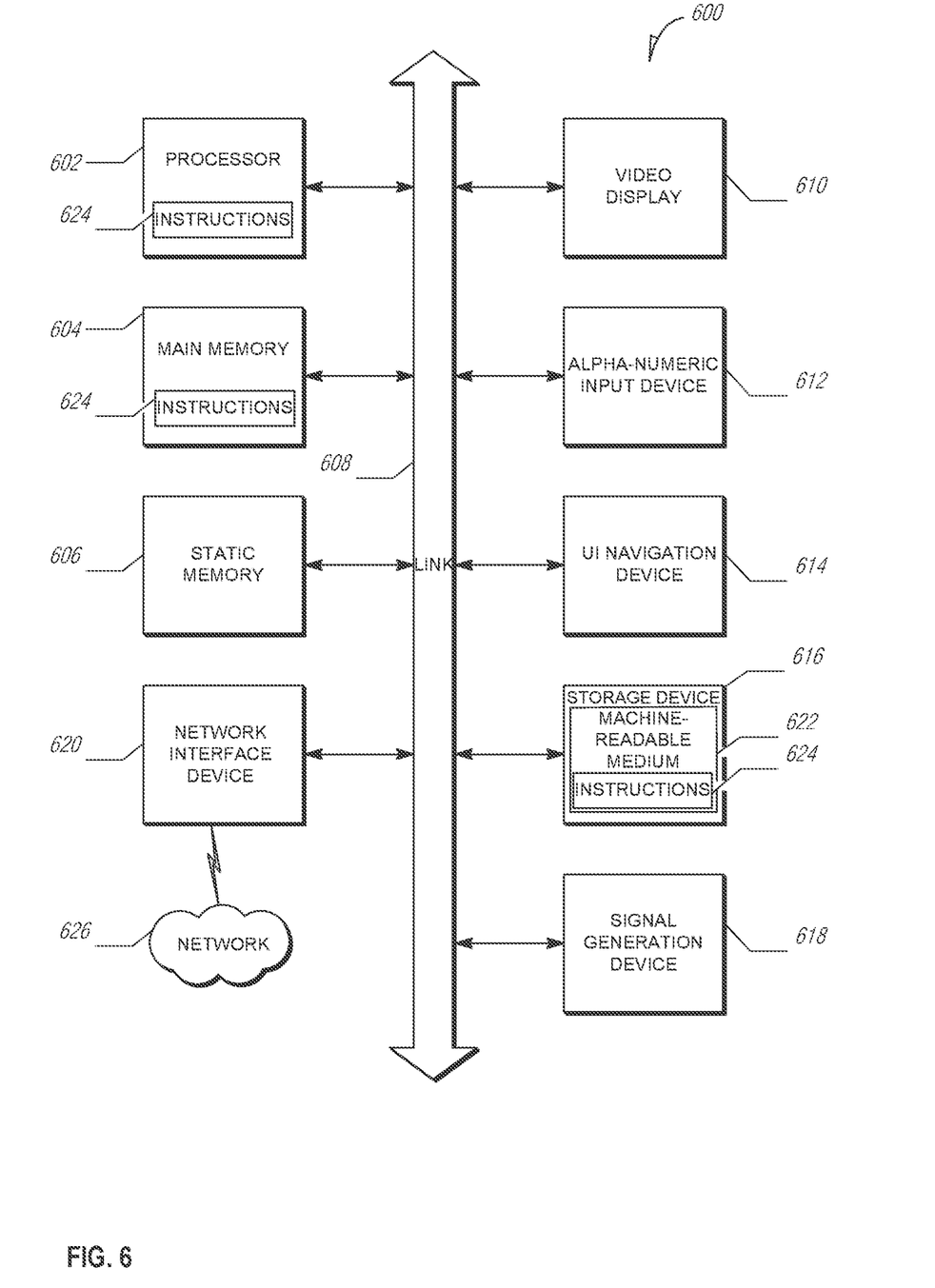
FIG. 6 is a block diagram of machine in the example form of a computer system within which a set instructions, for causing the machine to perform any one or more of the methodologies discussed herein, may be executed.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter for community drone monitoring and information exchange (such as a device, apparatus, or machine) comprising: a system for UAV monitoring, the system comprising: network interface to receive location information that includes a location of an unmanned aerial vehicle (UAV); a notification module to: query a policy database to retrieve a notification condition for a first property with respect to UAVs; calculate a distance between the UAV and the first property using the received location information; and determine if the distance of the UAV with respect to the first property is within a range defined in the notification condition for the first property; and wherein the network interface is to transmit a notification to a party associated with the first property when the distance of the UAV with respect to the first property is within the range defined in the notification condition for the first property.

In Example 2, the subject matter of Example 1 may include, wherein the location information is obtained from a sensor associated with a second property and wherein the system includes an information request module to: query the policy database to retrieve an information sharing preference for a party associated with the second property; and before transmitting the notification to the party associated with the first property, confirm that the information sharing preference allows for transmission of the location information to the party associated with the first property.

In Example 3, the subject matter of any of Examples 2 to 3 may include, wherein the information request module is to store an indication of increased reputation for the sensor associated with the second property in response to validating the location information with a third sensor.

In Example 4, the subject matter of any of Examples 2 to 4 may include, wherein the notification module is to: trigger transmission of a request for speed and path information for the UAV in response to receiving the location information; receive the speed and path information in response to the request; and calculate an estimated time-of-arrival to the first property with respect to the UAV based on the received speed and path information; and transmit a notification to the party associated with the first property including the estimated time-of-arrival to the first property.

In Example 5, the subject matter of any of Examples 2 to 5 may include, wherein the notification module is to: query a drone information database using an identification of the UAV to determine camera capabilities of the UAV; calculate a time when the UAV will be able to see the first property; and transmit a notification to the party associated with the first property, the notification including the calculated time.

In Example 6, the subject matter of any of Examples 2 to 6 may include, further comprising an information request module to: receive a request, from a requesting party, for elevation information of the UAV; determine that a first sensor on the first property has the elevation information for the UAV; query the policy database to retrieve an information sharing preference for the party associated with the first property; and transmit the elevation information to the requesting party when the information sharing preference indicates the requesting party is an authorized party.

In Example 7, the subject matter of any of Examples 2 to 7 may include, wherein the notification module is to: transmit a notification to an operator of the UAV to leave the first property based on a temporal condition for the first property; and store an indication of lower reputation for the UAV in a drone information database when the UAV does not leave the first property within a set period of time.

Example 8 includes subject matter for community drone monitoring and information exchange (such as a device, apparatus, or machine) comprising: a system for providing UAV flight information, the system comprising: a network interface to receive planned route information from a drone service with respect to an unmanned aerial vehicle (UAV), the planned route information including a path of the UAV for the route; a route request module to: query a property location database with the planned route information to determine at least one home service corresponding to at least one property along the planned route; transmit a request to the at least one home service for cost information for flying over the at least one property along the planned route; receive a response from the home service that includes a cost for flying over the at least one property; and wherein the network interface is to transmit the cost for flying over the at least one property to the drone service.

In Example 9, the subject matter of Example 8 may include, wherein the planned route information from the drone service with respect to the UAV includes a time when the planned route is to occur and wherein the request includes the time.

In Example 10, the subject matter of any of Examples 9 to 10 may include, wherein the response from the home service includes an indication that the cost to fly over the at least one property at the time is higher than the cost to fly over the at least one property at a different time and wherein the network interface is to transmit the cost to fly over the at least one property at the different time to the drone service.

In Example 11, the subject matter of any of Examples 9 to 11 may include, wherein the network interface is to receive a request for condition information along the planned route; and wherein the route request module is to: transmit a request for condition information to the home service; and receive current conditions for the at least one property in response to the request for condition information.

In Example 12, the subject matter of any of Examples 9 to 12 may include, wherein the condition information includes visibility conditions at the at least one property.

In Example 13, the subject matter of any of Examples 9 to 13 may include, wherein the condition information includes an indication of whether a property owner is hostile to drone operation over the at least one property.

Example 14 includes subject matter for community drone monitoring and information exchange (such as a method, means for performing acts, machine readable medium including instructions that when performed by a machine cause the machine to performs acts, or an apparatus configured to perform) comprising a method of UAV monitoring, the method comprising: receiving, using at least one processor, location information that includes a location of an unmanned aerial vehicle (UAV); querying, using the at least one processor, a policy database to retrieve a notification condition for a first property with respect to UAVs; calculating, using the at least one processor, a distance between the UAV and the first property using the received location information determining, using the at least one processor, if the distance of the UAV with respect to the first property is within a range defined in the notification condition for the first property; and transmitting, using the at least one processor, a notification to a party associated with the first property when the distance of the UAV with respect to the first property is within the range defined in the notification condition for the first property.

In Example 15, the subject matter of Example 14 may include, wherein receiving location information that includes the location of the UAV comprises: receiving the location information obtained from a sensor associated with a second property; querying the policy database to retrieve an information sharing preference for a party associated with the second property; and before transmitting the notification to the party associated with the first property, confirming that the information sharing preference allows for transmission of the location information to the party associated with the first property.

In Example 16, the subject matter of any of Examples 15 to 16 may include, storing an indication of increased reputation for the sensor associated with the second property in response to validating the location information with a third sensor.

In Example 17, the subject matter of any of Examples 15 to 17 may include, triggering transmission of a request for speed and path information for the UAV in response to receiving the location information; receiving the speed and path information in response to the request; and calculating an estimated time-of-arrival to the first property with respect to the UAV based on the received speed and path information; and transmitting a notification to the party associated with the first property including the estimated time-of-arrival to the first property.

In Example 18, the subject matter of any of Examples 15 to 18 may include, wherein the request for speed and path information is transmitted to a drone service via an information routing system.

In Example 19, the subject matter of any of Examples 15 to 19 may include, wherein the request for speed and path information is transmitted to at least one camera sensor.

In Example 20, the subject matter of any of Examples 15 to 20 may include, querying a drone information database using an identification of the UAV to determine camera capabilities of the UAV; calculating a time when the UAV will be able to see the first property; and transmitting a notification to the party associated with the first property, the notification including the calculated time.

In Example 21, the subject matter of any of Examples 15 to 21 may include, receiving a request, from a requesting party, for elevation information of the UAV; determining that a first sensor on the first property has the elevation information for the UAV; querying the policy database to retrieve an information sharing preference for the party associated with the first property; and transmitting the elevation information to the requesting party when the information sharing preference indicates the requesting party is an authorized party.

In Example 22, the subject matter of any of Examples 15 to 22 may include, wherein the requesting party is a drone operator.

In Example 23, the subject matter of any of Examples 15 to 23 may include, wherein the requesting party is law enforcement.

In Example 24, the subject matter of any of Examples 15 to 24 may include, wherein the requesting party is a party associated with a second property.

In Example 25, the subject matter of any of Examples 15 to 25 may include, analyzing a coverage area for a plurality of sensors with respect to a plurality of properties; determining that a density of sensors to property is lower than a threshold; and transmitting a notification to one or more parties associated with the plurality of properties that sensor coverage for the plurality of properties is below the threshold.

In Example 26, the subject matter of any of Examples 15 to 26 may include, transmitting a notification to an operator of the UAV to leave the first property based on a temporal condition for the first property; and storing an indication of lower reputation for the UAV in a drone information database when the UAV does not leave the first property within a set period of time.

Example 27 includes subject matter for community drone monitoring and information exchange (such as a method, means for performing acts, machine readable medium including instructions that when performed by a machine cause the machine to performs acts, or an apparatus configured to perform) comprising a method for providing UAV rout information, the method comprising: receiving planned route information from a drone service with respect to an unmanned aerial vehicle (UAV), the planned route information including a path of the UAV for the route; querying a property location database with the planned route information to determine at least one home service corresponding to at least one property along the planned route; transmitting a request to the at least one home service for cost information for flying over the at least one property along the planned route; receiving a response from the home service that includes a cost for flying over the at least one property; and transmitting the cost for flying over the at least one property to the drone service.

In Example 28, the subject matter of Example 27 may include, wherein receiving the planned route information from the drone service with respect to the UAV includes receiving a time when the planned route is to occur and wherein the request includes the time.

In Example 29, the subject matter of any of Examples 28 to 29 may include, wherein the response from the home service includes an indication that the cost to fly over the at least one property at the time is higher than the cost to fly over the at least one property at a different time and transmitting the cost to fly over the at least one property at the different time to the drone service.

In Example 30, the subject matter of any of Examples 28 to 30 may include, receiving a request for condition information along the planned route; and transmitting a request for condition information to the home service; and receiving current conditions for the at least one property in response to the request for condition information.

In Example 31, the subject matter of any of Examples 28 to 31 may include, wherein the condition information includes visibility conditions at the at least one property.

In Example 32, the subject matter of any of Examples 28 to 32 may include, wherein the condition information includes an indication of whether a property owner is hostile to drone operation over the at least one property.

Example 33 includes at least one machine-readable medium including instructions, which when executed by a machine, cause the machine to perform operations of any of the methods of examples 14-26.

Example 34 includes at least one machine-readable medium including instructions, which when executed by a machine, cause the machine to perform operations of any of the methods of examples 27-31.

Example 35 includes an apparatus comprising means for performing any of the methods of examples 14-26.

Example 36 includes an apparatus comprising means for performing any of the methods of examples 27-31.

Example 37 includes an apparatus for UAV monitoring, the apparatus comprising: means for receiving location information that includes a location of an unmanned aerial vehicle (UAV); means for querying a policy database to retrieve a notification condition for a first property with respect to UAVs; means for calculating a distance between the UAV and the first property using the received location information; means for determining if the distance of the UAV with respect to the first property is within a range defined in the notification condition for the first property; and means for transmitting a notification to a party associated with the first property when the distance of the UAV with respect to the first property is within the range defined in the notification condition for the first property.

In Example 38, the subject matter of Example 37 may include, wherein means for receiving location information that includes the location of the UAV comprises: means for receiving the location information obtained from a sensor associated with a second property; means for querying the policy database to retrieve an information sharing preference for a party associated with the second property; and before transmitting the notification to the party associated with the first property, means for confirming that the information sharing preference allows for transmission of the location information to the party associated with the first property.

In Example 39, the subject matter of any of Examples 38 to 39 may include, means for storing an indication of increased reputation for the sensor associated with the second property in response to validating the location information with a third sensor.

In Example 40, the subject matter of any of Examples 38 to 40 may include, means for triggering transmission of a request for speed and path information for the UAV in response to receiving the location information; means for receiving the speed and path information in response to the request; and means for calculating an estimated time-of-arrival to the first property with respect to the UAV based on the received speed and path information; and means for transmitting a notification to the party associated with the first property including the estimated time-of-arrival to the first property.

In Example 41, the subject matter of any of Examples 38 to 41 may include, wherein the request for speed and path information is transmitted to a drone service via an information routing system.

In Example 42, the subject matter of any of Examples 38 to 42 may include, wherein the request for speed and path information is transmitted to at least one camera sensor.

In Example 43, the subject matter of any of Examples 38 to 43 may include, means for querying a drone information database using an identification of the UAV to determine camera capabilities of the UAV; means for calculating a time when the UAV will be able to see the first property; and means for transmitting a notification to the party associated with the first property, the notification including the calculated time.

In Example 44, the subject matter of any of Examples 38 to 44 may include, means for receiving a request, from a requesting party, for elevation information of the UAV; means for determining that a first sensor on the first property has the elevation information for the UAV; means for querying the policy database to retrieve an information sharing preference for the party associated with the first property; and means for transmitting the elevation information to the requesting party when the information sharing preference indicates the requesting party is an authorized party.

In Example 45, the subject matter of any of Examples 38 to 45 may include, wherein the requesting party is a drone operator.

In Example 46, the subject matter of any of Examples 38 to 46 may include, wherein the requesting party is law enforcement In Example 47, the subject matter of any of Examples 38 to 47 may include, wherein the requesting party is a party associated with a second property.

In Example 48, the subject matter of any of Examples 38 to 48 may include, means for analyzing a coverage area for a plurality of sensors with respect to a plurality of properties; means for determining that a density of sensors to property is lower than a threshold; and means for transmitting a notification to one or more parties associated with the plurality of properties that sensor coverage for the plurality of properties is below the threshold.

In Example 49, the subject matter of any of Examples 38 to 49 may include, means for transmitting a notification to an operator of the UAV to leave the first property based on a temporal condition for the first property; and means for storing an indication of lower reputation for the UAV in a drone information database when the UAV does not leave the first property within a set period of time.

Example 50 includes an apparatus for providing UAV flight information comprising: means for receiving planned route information from a drone service with respect to an unmanned aerial vehicle (UAV), the planned route information including a path of the UAV for the route; means for querying a property location database with the planned route information to determine at least one home service corresponding to at least one property along the planned route; means for transmitting a request to the at least one home service for cost information for flying over the at least one property along the planned route; means for receiving a response from the home service that includes a cost for flying over the at least one property; and means for transmitting the cost for flying over the at least one property to the drone service.

In Example 51, the subject matter of Example 50 may include, wherein receiving the planned route information from the drone service with respect to the UAV includes receiving a time when the planned route is to occur and wherein the request includes the time.

In Example 52, the subject matter of any of Examples 51 to 52 may include, wherein the response from the home service includes an indication that the cost to fly over the at least one property at the time is higher than the cost to fly over the at least one property at a different time and transmitting the cost to fly over the at least one property at the different time to the drone service.

In Example 53, the subject matter of any of Examples 51 to 53 may include, means for receiving a request for condition information along the planned route; and means for transmitting a request for condition information to the home service; and means for receiving current conditions for the at least one property in response to the request for condition information.

In Example 54, the subject matter of any of Examples 51 to 54 may include, wherein the condition information includes visibility conditions at the at least one property.

In Example 55, the subject matter of any of Examples 51 to 55 may include, wherein the condition information includes an indication of whether a property owner is hostile to drone operation over the at least one property.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for unmanned aerial vehicle (UAV) monitoring, the system comprising:
   at least one processor;
   a network interface to receive location information that includes a location of a UAV; and
   a storage device comprising instructions, which when executed by the at least one processor, configure the at least one processor to:
   determine the UAV is within a range distance of a house; and
   query a database to retrieve a purpose notification condition for the house;
   wherein the network interface is to transmit a first notification to a homeowner of the house when the UAV meets the purpose notification condition.

2. The system of claim 1, wherein the network interface is to transmit a second notification to an operator of the UAV.

3. The system of claim 1, wherein the at least one processor is further configured to:
   calculate a distance between the UAV and the house using the received location information.

4. The system of claim 1, wherein the at least one processor is further configured to:
   receive speed and path information of the UAV;
   calculate an estimated time-of-arrival to the house with respect to the UAV based on the received speed and path information; and
   transmit a third notification to the homeowner of the house including the estimated time-of-arrival to the house.

5. The system of claim 1, wherein the purpose notification condition is set by the homeowner.

6. The system of claim 1, wherein the first notification includes cargo information for the UAV.

7. The system of claim 1, wherein the network interface is to transmit a weather condition to an operator of the UAV based on the location of the UAV.

8. At least one non-transitory computer-readable storage device comprising instructions for unmanned aerial vehicle (UAV) monitoring, which when executed by a machine, cause the machine to:
   receive location information that includes a location of a UAV;
   determine the UAV is within a range distance of a house;
   query a database to retrieve a purpose notification condition for the house; and
   transmit a first notification to a homeowner of the house when the UAV meets the purpose notification condition.

9. The at least one non-transitory computer-readable storage device of claim 8, further comprising instructions to transmit a second notification to an operator of the UAV.

10. The at least one non-transitory computer-readable storage device of claim 8, further comprising instructions to calculate a distance between the UAV and the house using the received location information.

11. The at least one non-transitory computer-readable storage device of claim 8, further comprising instructions to:
receive speed and path information of the UAV;
calculate an estimated time-of-arrival to the house with respect to the UAV based on the received speed and path information; and
transmit a third notification to the homeowner of the house including the estimated time-of-arrival to the house.

12. The at least one non-transitory computer-readable storage device of claim 8, wherein the purpose notification condition is set by the homeowner.

13. The at least one non-transitory computer-readable storage device of claim 7, wherein the first notification includes cargo information for the UAV.

14. The at least one non-transitory computer-readable storage device of claim 8, further comprising instructions to transmit a weather condition to an operator of the UAV based on the location of the UAV.

15. At least one non-transitory computer-readable storage device comprising instructions for unmanned aerial vehicle (UAV) monitoring, which when executed by a machine, cause the machine to:
query a policy database to retrieve a notification condition for a property with respect to UAVs;
determine, based on a location of the UAV, the UAV is located within a geofence boundary of the property, the geofence boundary defined in the notification condition; and
transmit a notification to a party associated with the property in response to the determination that the UAV is within the geofence boundary.

16. The at least one non-transitory computer-readable storage device of claim 15, wherein the notification is a Short Message Service (SMS) message.

17. The at least one non-transitory computer-readable storage device of claim 15, wherein the notification is an email.

18. The at least one non-transitory computer-readable storage device of claim 15, wherein the notification is to be displayed in a user interface of an application.

19. The at least one non-transitory computer-readable storage device of claim 15, wherein the notification is to be displayed on a website.

20. The at least one non-transitory computer-readable storage device of claim 15, wherein the determination of the UAV location is based on information from a combination of two or more sensors of different types.

21. The at least one non-transitory computer-readable storage device of claim 15, wherein the notification includes an estimated time-of-arrival of the UAV.

22. The at least one non-transitory computer-readable storage device of claim 21, wherein the estimated time-of-arrival is a delivery time.

23. A system for unmanned aerial vehicle (UAV) monitoring, the system comprising:
at least one processor;
a network interface to receive location information that includes a location of a UAV; and
a storage device comprising instructions, which when executed by the at least one processor, configure the at least one processor to:
query a policy database to retrieve a notification condition for a property with respect to UAVs;
determine, based on a location of the UAV, the UAV is located within a geofence boundary of the property, the geofence boundary defined in the notification condition; and
transmit a notification to a party associated with the property in response to the determination that the UAV is within the geofence boundary.

24. The system of claim 23, wherein the notification is a Short Message Service (SMS) message.

25. The system of claim 23, wherein the notification is an email.

26. The system of claim 23, wherein the notification is to be displayed in a user interface of an application.

27. The system of claim 23, wherein the notification is to be displayed on a website.

28. The system of claim 23, wherein the determination of the UAV location is based on information from a combination of two or more sensors of different types.

29. The system of claim 23, wherein the notification includes an estimated time-of-arrival of the UAV.

30. The system of claim 29, wherein the estimated time-of-arrival is a delivery time.

* * * * *

UNITED STATES PATENT AND TRADEMARK OFFICE
CERTIFICATE OF CORRECTION

PATENT NO. : 11,295,623 B2
APPLICATION NO. : 16/728227
DATED : April 5, 2022
INVENTOR(S) : Wouhaybi et al.

It is certified that error appears in the above-identified patent and that said Letters Patent is hereby corrected as shown below:

In the Claims

In Column 21, Line 18, in Claim 13, delete "claim 7," and insert --claim 8,-- therefor Signed and Sealed this
Tenth Day of September, 2024

Katherine Kelly Vidal
*Director of the United States Patent and Trademark Office*